June 8, 1926.
A. LASCH ET AL
1,587,593
DEVICE FOR TIPPING VESSELS
Filed Sept. 19, 1924    2 Sheets-Sheet 1
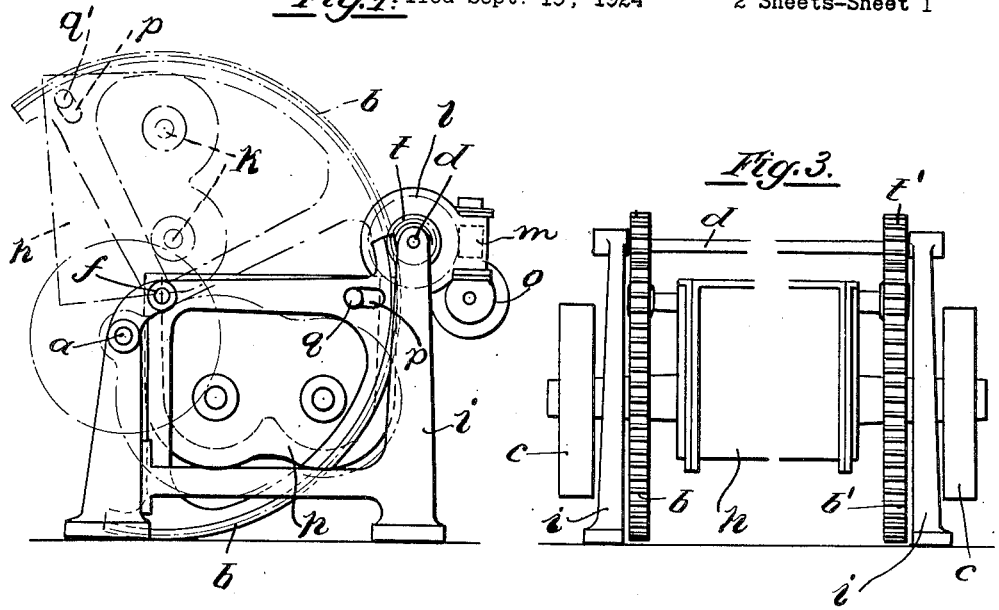
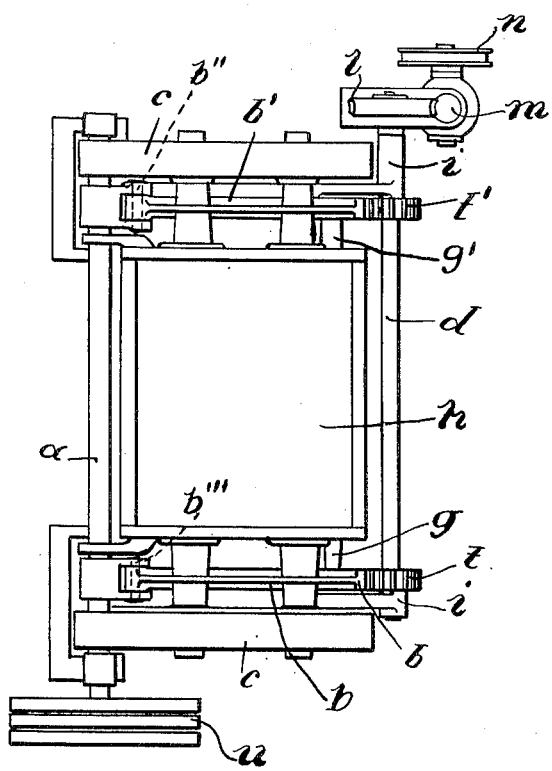
Inventors
Albert Lasch and
Heinrich Kircher

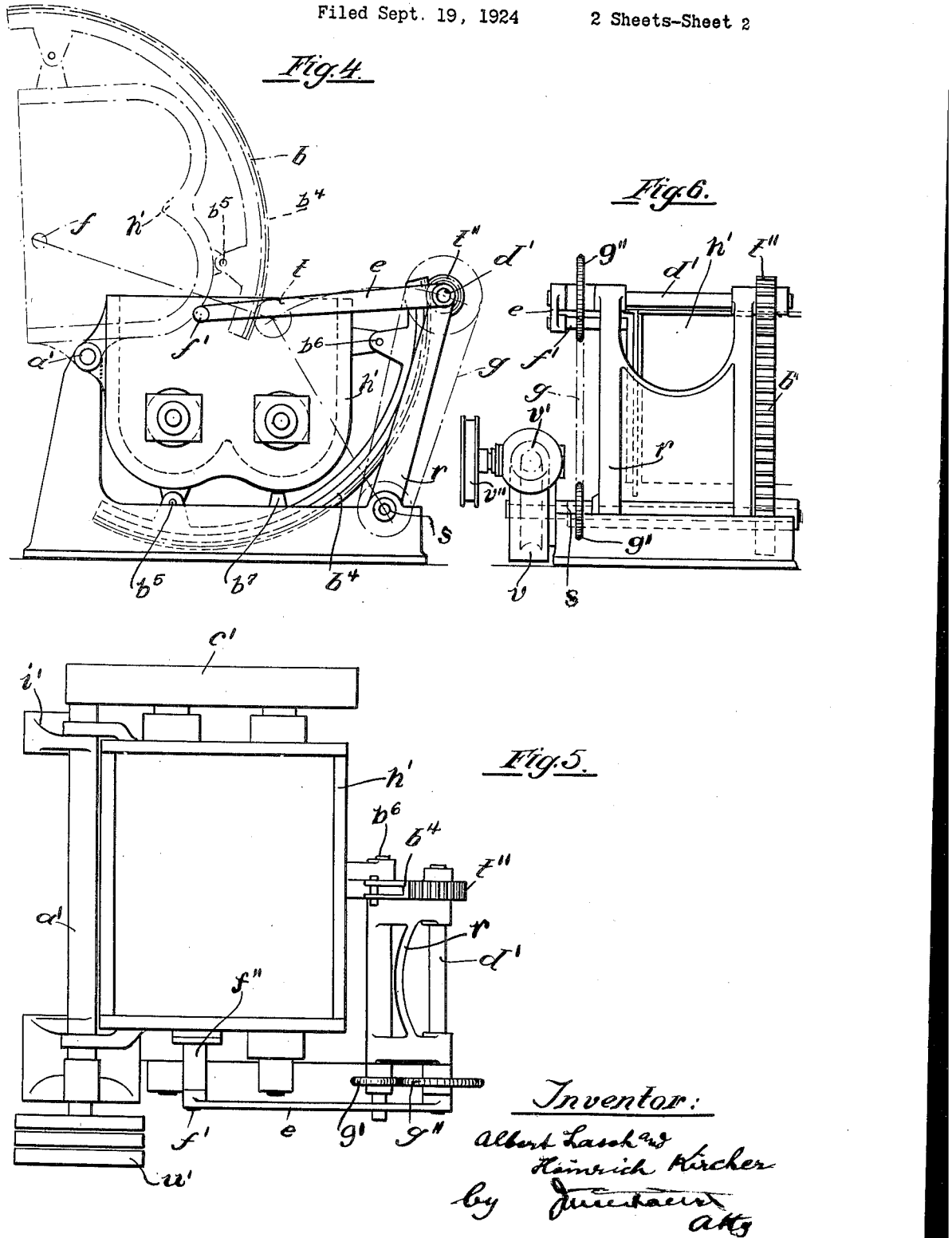

Patented June 8, 1926.

1,587,593

UNITED STATES PATENT OFFICE.

ALBERT LASCH AND HEINRICH KIRCHER, OF CANNSTATT, GERMANY, ASSIGNORS TO THE FIRM: CANNSTATTER MISCH- & KNETMASCHINEN-FABRIK CANNSTATTER DAMPF-BACKOFEN-FABRIK WERNER & PFLEIDERER, OF CANNSTATT, GERMANY.

DEVICE FOR TIPPING VESSELS.

Application filed September 19, 1924, Serial No. 738,697, and in Germany July 26, 1923.

Our invention relates to devices for tipping the troughs of kneading and mixing machines. In such machines as heretofore designed tipping was effected by means of winches acting on the trough through the medium of cables or machines, or by means of toothed segments arranged concentrically to the trunnions of the trough, and gears for rotating such segments.

Devices of the former type require a large and high frame and balance weights for the trough so that the space required is considerable and the initial cost is high whereas in machines of the segment type it is not possible to employ segments of large radius while keeping the trough in a position which is convenient to the operator inasmuch as the segments would have to extend below the floor level. If, on the other hand, the trough pivot is placed at a level permitting the arrangement of segments of large radius above the floor, the charging, cleaning and observation of the machine become inconvenient and require expensive platforms. This drawback cannot be overcome by reducing the radius of the segments for the tooth pressures would be unduly increased causing considerable wear and high power consumption.

We overcome these drawbacks by arranging toothed segments eccentrically to the trough pivot, and make up for the eccentricity either by providing a floating connection between the trough and the segment or by making the segment or the means for operating it adjustable so as to keep the parts in gear in all relative positions of the segment and the operating means.

In the drawings affixed to this specification and forming part thereof, two devices embodying our invention are illustrated diagrammatically by way of example.

In the drawings—

Fig. 1 is an elevation,

Fig. 2 a plan view, and

Fig. 3 an end elevation of the first device, and

Figs. 4 to 6 are similar views of the other device.

Referring first to Figs. 1 to 3, a trough $h$ is free to rock about a shaft $a$ mounted on one side of the machine frame $i$. Kneading arms (not shown) or other mixing or kneading members are secured on shafts $k$, $k$ mounted in said trough and driven from the shaft $a$ by means of suitable gears (not shown) enclosed in casings $c$, $c$. Shaft $a$, which carries fast and loose pulleys $u$, is arranged at such level that the trough can be conveniently charged by an operator standing on the floor and when tipped can be emptied onto a tank supported on a truck running on the floor.

The tipping mechanism comprises two segments $b$, $b^1$, one on each side of the trough, the pinions $t'$ meshing therewith and a worm wheel $l$, being fixed on a common shaft $d$ mounted in the frame $i$ on the side opposite shaft $a$. A worm $m$ driven by a pulley and bevel gear $o$ serves for driving shaft $d$.

The segments $b$, $b'$ are suspended for rotation in the frame $i$ by means of pivot pins $b''$ and $b'''$ disposed at points of the frame above and to the rear of the shaft $a$ to which the trough $h$ is hinged. The pivots of the segments are thus eccentrically located with regard to the shaft $a$ and we are thus enabled to employ segments having longer radii without extending in contact with the floor. In consequence of this arrangement the gear casings $c$ and the rear wall of the trough move clear of the shaft $d$ when the trough is being tipped. A floating connection is established between the trough and the segments, pins $q$, $q'$ on the trough engaging slots $p$ in the segments $b$, $b'$.

When it is desired to tip the trough $h$, rotation is imparted to the pulley $n$ and the segments $b$, $b'$ turning about their pivots $b''$, $b'''$ lift the trough by means of the pins $q$, $q'$ into the position shown in dot and dash lines, wherein it can easily be emptied.

In the modification shown in Figs. 4 to 6, only a single segment $b^4$ is provided, which is rigidly connected with the trough $h'$ mounted on shaft $a'$ which carries fast and loose pulleys $u'$ and is supported in the frame $i'$. The segment $b^4$ is rigidly secured to the trough by means of eyes $b^5$ and $b^6$ and rests on a lug $b^7$. The centre point of the segment $b^4$ is at $f'$. At this point, a pin $f''$ is secured to the trough $h'$, this pin being connected with a rocking frame $r$ by a link $e$. The frame $r$ is fulcrumed in the machine frame $i'$ on a shaft $s$ and carries a shaft $d'$ at its upper end on which a pinion $t''$ is secured. The pinion $t''$ meshes with the segment $b^4$ and rotation is imparted to it by means of a chain drive $g$ and sprockets $g'$ and $g''$ on the shafts $s$ and $d'$, respectively.

A worm wheel $v$ secured on one end of the shaft $s$ meshes with a worm $v'$ on the shaft on which a pulley $v''$ is fixed.

When the shaft $s$ is rotated the segment $b^4$ tends to turn about its centre point $f$ but is compelled to follow the rotation of the trough $h'$ fixed to the segment, about shaft $a'$. During this rotation the pinion $t''$ is held in engagement with the segment $b^4$ by the cooperation of the link $e$ and the rocking frame $r$, which carry the shaft $d'$ on which the pinion is mounted.

The gearings shown in the drawings, such as the pinions, sprockets, chain and the like may of course be replaced by other power transmission means without departing from the spirit of the invention.

It is also possible to vary the rate of tipping by providing change gears comprising segments and pinions of various radii which may be combined as desired.

Instead of being geared as shown, the segments may also be operated by friction gears and in this case the segment need not be circular but may be curved as desired, for instance, in conformity with the shape of the trough.

We wish it to be understood that we do not desire to be limited to the exact details of construction shown and described, for obvious modifications will occur to a person skilled in the art.

We claim:

1. Tipping mechanism for mixing machines comprising a machine frame, a trough supported in said frame for rotation about a horizontal axis, a segment whose centre point is located at a higher level than the pivotal axis of said trough, and a connection between said segment and said trough, whereby said trough is caused to follow the rotary movement of said segment.

2. Tipping mechanism for mixing machines comprising a machine frame, a trough supported in said frame for rotation about a horizontal axis, a segment whose centre point is located at a higher level than and to the rear of the pivotal axis of said trough, and a connection between said segment and said trough, whereby said trough is caused to follow the rotary movement of said segment.

3. Tipping mechanism for mixing machines comprising a machine frame, a trough supported in said frame for rotation about a horizontal axis, a segment whose centre point is located at a higher level than the pivotal axis of said trough, and a rigid connection between said segment and said trough, whereby said trough is caused to follow the rotary movement of said segment.

4. Tipping mechanism for mixing machines comprising a machine frame, a trough supported in said frame for rotation about a horizontal axis, a segment whose centre point is located at a higher level than the pivotal axis of said trough, and a rigid connection between said segment and said trough, whereby said trough is caused to follow the rotary movement of said segment, means acting on the circumference of said segment for rotating same and means for keeping said rotating means engaged with said segment notwithstanding the eccentricity of its motion.

5. Tipping mechanism for mixing machines comprising a machine frame, a trough supported in said frame for rotation about a horizontal axis, a toothed segment fixed to said trough and having its centre point situated at a point of said trough above and to the rear of said axis, means supported on said machine frame and in gear with said segment for rotating said segment about said axis and a link connecting said rotating means with said trough at the centre point of said segment.

6. Tipping mechanism for mixing machines comprising a machine frame, a trough supported in said frame for rotation about a horizontal axis, a toothed segment fixed to said trough and having its centre point situated at a point of said trough above and to the rear of said axis, a rocking member mounted in said machine frame, a pinion mounted on said member and gearing with said segment, means for driving said pinion and a link connecting said rocking member with said trough at the centre point of said segment.

In testimony whereof we affix our signatures.

ALBERT LASCH.
HEINRICH KIRCHER.